United States Patent [19]

Theuber

[11] Patent Number: 5,507,334
[45] Date of Patent: Apr. 16, 1996

[54] APPARATUS AND METHOD FOR MOUNTING TIRES ON SPLIT WHEELS

[75] Inventor: David M. Theuber, Houston, Tex.

[73] Assignee: Theuber Manufacturing, Inc., Houston, Tex.

[21] Appl. No.: 243,292

[22] Filed: May 17, 1994

[51] Int. Cl.[6] ................................. B60G 25/132
[52] U.S. Cl. .................. 157/1.35; 157/1.0; 157/1.1
[58] Field of Search ................. 157/1.0, 1.1, 1.11, 157/1.2, 1.17, 2, 1.26, 1.28, 1.36, 1.35, 1.38, 1.42, 1.33; 29/235, 238, 252

[56] References Cited

U.S. PATENT DOCUMENTS

| | | |
|---|---|---|
| 2,228,086 | 1/1941 | Rodgers ........................... 157/1 |
| 2,762,424 | 9/1956 | Zito . |
| 3,456,707 | 7/1969 | Bernhardt . |
| 3,882,920 | 5/1975 | Barnes et al. .................. 157/1.1 |
| 4,378,834 | 4/1983 | Satzler . |

Primary Examiner—D. S. Meislin
Attorney, Agent, or Firm—Pravel, Hewitt, Kimball & Krieger

[57] ABSTRACT

Apparatus and method are provided for mounting tires on divided or split wheels. Tension members are guided by a guide body through holes of the wheels to pull the two halves of the wheel together after a tire has been put in place between the halves. Lug bolts to hold the wheel segments together are placed in cavities in the guide body and protrude to hold the bolts in position for affixing nuts and to prevent paint damage on the surface of wheels.

12 Claims, 3 Drawing Sheets

APPARATUS AND METHOD FOR MOUNTING TIRES ON SPLIT WHEELS

BACKGROUND OF THE INVENTION

1. Field of the Invention

This invention provides apparatus and method for mounting tires on divided or split wheels. More particularly, a quick-mount tire press and method for utilizing existing holes in the wheel are provided.

2. Description of Related Art

Both solid and pneumatic tires are mounted on divided or split wheels and used on many types of vehicles, including road vehicles and commercial vehicles of all types. Mounting of tires on the split wheels is a time-consuming operation. For example, mounting a 700-12 solid tire after repair or replacement using normal procedures in a standard press will consume approximately 15 to 20 minutes. Mounting tires in vehicle manufacturing environments also requires high labor costs. In either a repair operation or in connection with manufacturing, there is not only a need to mount the tires in minimum time but also it is important that damage not occur to the paint of the wheel during the operation.

Conventional methods of mounting tires on split or divided wheels include placing a stand adapted to fit into the flange of a half split wheel in the center of a base platen on a press. One-half of the split wheel is then placed on the pressing stand with the studs facing up and the flange resting on the mounting stand. The tire is then placed over the split wheel, lubricated for friction reduction on the wheel, and pushed down onto the lower half of the wheel by a cage pressing against the top face of the tire and the top platen of the press. The cage is then removed and the other half of the split wheel is placed on the lower half with the bolt holes aligned with the studs. The second half of the split wheel is then pressed down into the tire slowly, making sure that the studs line up with the bolt holes. The two halves are then secured together with nuts on the bolts and pressure from the press is released such that the tire can be removed from the press. This process requires considerable care and normally causes damage to the paint of the split wheel.

U.S. Pat. No. 3,456,707 discloses a tire assembling machine for use with aircraft wheels. The apparatus disclosed has no alignment mechanism and would not be able to mount most solid tires, because it has only a single member for applying the force required to bring the rim halves together.

There is need for a method which can be used to bring together quickly and in proper alignment the halves of split wheels within both solid and pneumatic tires. Preferably, the apparatus would also provide means to insure mounting of pneumatic tires with proper placement of the valve stem. The apparatus and method should be adaptable to any of the large number of hole patterns in split wheels.

SUMMARY OF THE INVENTION

Apparatus is provided to mount tires on divided or split wheels. The apparatus includes a guide body to guide tension members through a plurality of the holes in split wheels. The tension members are used to bring together the halves of divided wheels after a tire has been placed between the two halves. The tension members are driven by a hydraulic cylinder or other means of supplying a force to the members.

In one embodiment of the invention, one segment of a split wheel is placed on a guide plate and a tire is placed on the segment, the upper segment of the split wheel is placed over the tire and the tension members are moved to protrude above the split wheel, a split cylinder is placed on the tension members to prevent movement of the members through the holes of the upper segment, and the tension members are moved to bring the halves of the wheel into juxtaposition and align the holes of the two halves of the wheel, allowing bolts to be used to fix the segments together with the tire mounted on the split wheel.

DETAILED DESCRIPTION OF THE INVENTION

Figure 1:
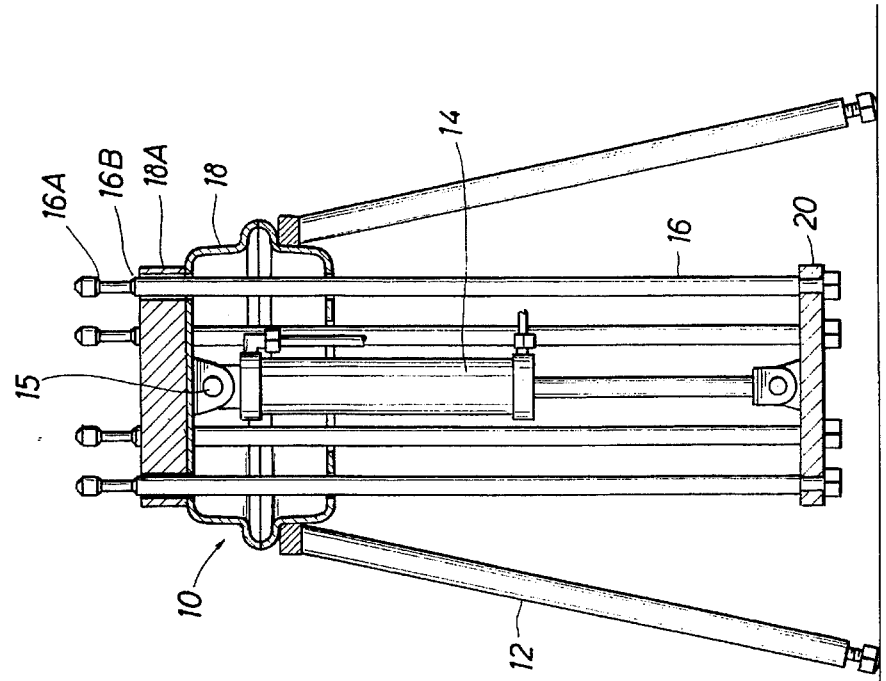
FIG. 1 is a side view of the tire press showing tension members, used to bring wheel halves together, in a retracted position.

Referring to FIG. 1, quick mounting tire press 10 is shown supported by legs 12. Force for the press is supplied by hydraulic cylinder 14. Alternatively, force may be supplied by mechanical gears of the press driven by a power source or by any other means for supplying force. Hydraulic cylinder 14 may be activated in either direction by applying hydraulic pressure to alternate sides of a piston within the cylinder. Cylinder 14 may be attached through its rod and body by pins 15. The rod or body of cylinder 14 may be attached to guide body 18, which guide body is also attached to legs 12 or other means or support. Guide body 18 may include plate 18A which is welded or otherwise attached to the remainder of guide body 18 to provide additional rigidity and strength to the guiding mechanism. A convenient source for guide body 18 is the halves of a divided wheel which are joined so as to match the outside diameters of the halves with machinery holes aligned in each half. Guide body cap 18A may then be affixed to guide body 18 to provide additional rigidity and strength to guide tension members 16. Any suitable body having holes therethrough for guiding tension members 16 is suitable. Tension members 16 are attached to movable plate 20 at the bottom and extend through guide body 18 in a pattern corresponding to the pattern of bolt holes in a split wheel upon which a tire is to be mounted. With the rod of hydraulic cylinder 14 in a retracted position, the top end of tension member 16 protrudes above guide body cap 18A a distance sufficient for a divided wheel and tire to be placed over tension members 16 below surface 16B. With the rod of hydraulic cylinder 14 in an extended position, tension members 16 are dimensioned so as to bring the halves of the divided wheel into juxtaposition.

Figure 2:
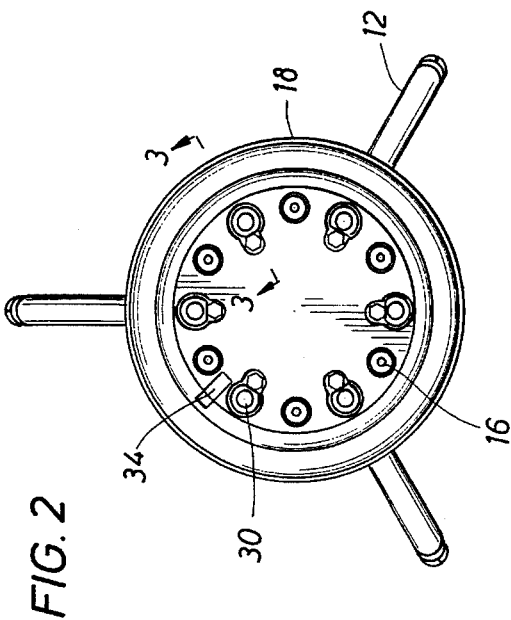
FIG. 2 is a top view of the tire press showing the pattern of bolt holes and tension members extending through bolt holes.

FIG. 2 is a top view of the quick-mount tire press. Tension members 16 are spaced apart in a pattern corresponding to a set of bolt holes in a split wheel, usually the set which will be used to mount the assembled rim onto a vehicle. It is not required that a tension member be used in each bolt hole, but preferably a sufficient number of bolt holes will be used in the set to produce a balanced force to bring the segments of a wheel together within a tire. Lug bolts 30 are used to join the halves of the divided or split wheel. Valve stem compartment 34 is placed for receiving the valve stem when mounting pneumatic tires, to insure that the valve stem is mounted on the proper side of the wheel. Compartment 34 will not be employed when solid tires are mounted.

Figure 3:
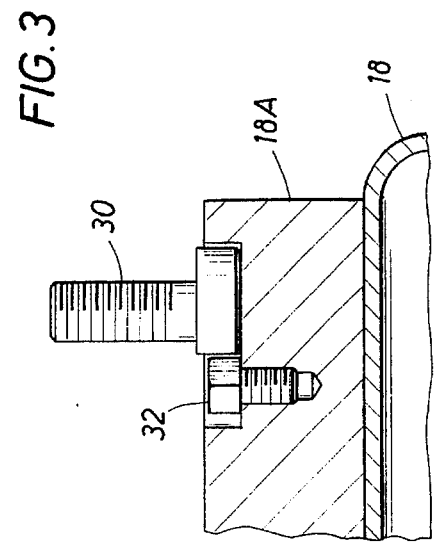
FIG. 3 is a detailed drawing of lug bolts in place in the cap of the guide body.

Cross-section 3—3 of FIG. 2 is shown in detail in FIG. 3. Lug bolt 30, used to fasten the halves of the split wheel together, is shown inserted in guide body cap 18A. The head of lug bolt 30 preferably has a thickness greater than the recess of cap 18A, such that the head protrudes a small distance above guide body cap 18A. The protrusion of the head of lug bolt 30 serves to insure that the lug bolt will be held securely in place when the wheel has been placed on the press and the halves brought together under the force of the press. Also, support of the wheel on the heads of lug bolts 30 prevents damage to the paint on the wheel, as the only surface of the wheel in contract with a solid surface is the small area around the bolt holes. Screw 32 may be placed in the recess of guide body cap 18A also, serving to help prevent rotation of lug bolt 30 as the nut is placed upon the bolt and tightened.

Figure 4:
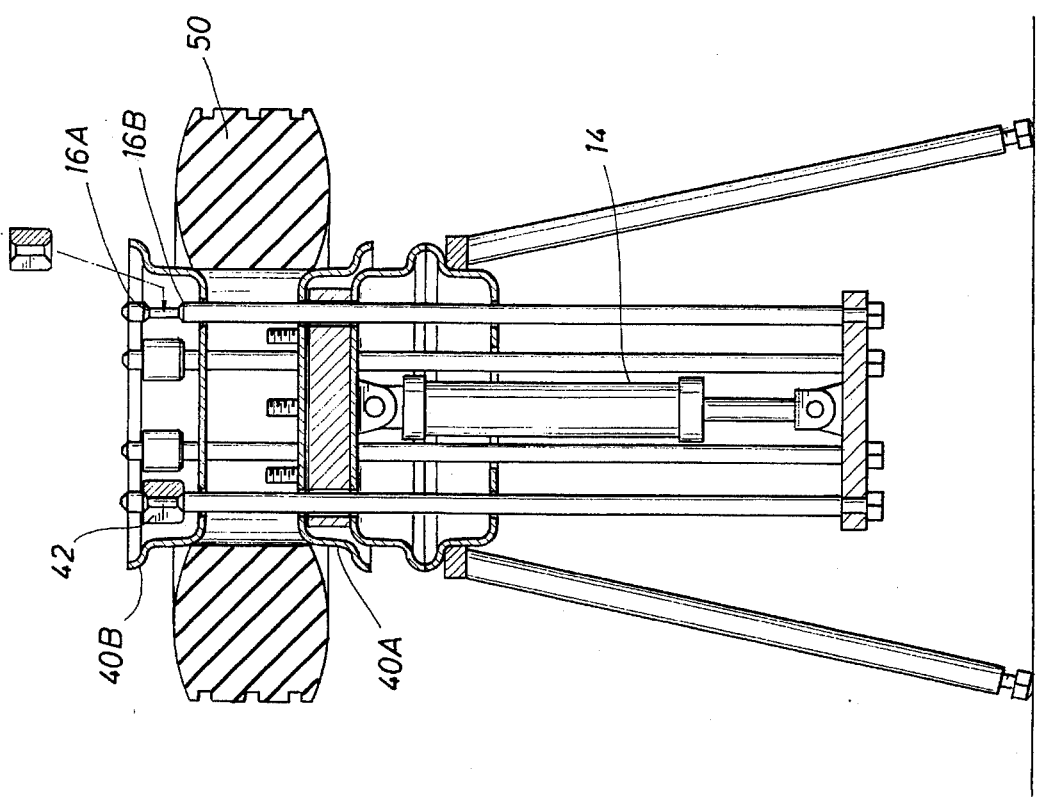
FIG. 4 shows a tire placed within a split wheel before the halves of the split wheel are brought into juxtaposition.

Referring to FIG. 4, halves 40A and 40B of a split wheel have been placed upon the quick-mount tire press and tire 50 has been placed between the halves of the wheel. Tension members 16 have been moved up by activating hydraulic cylinder 14, preferably after wheel segment 40A has been placed on the tire press. Tire 50 is put in place next, followed by segment 40B. With tension members 16 extended above wheel segment 40B, split cylinders 42 are put in place. Split cylinders 42 are adapted to be placed over tension members 16 and to contact tapered sections 16A and 16B, the split being sufficient to allow the smaller diameter segment of tension member 16 to pass through the split such that cylinder 42 essentially surrounds tension member 16. Alternatively, nuts can be placed upon a threaded end to tension member 16 or other means of mechanical attachment may be made to allow tension members 16 to pull downward to place sections 40A and 40B in juxtaposition. Split cylinder 42 also may have a tapered outside diameter adapted to fit into the "coined" bolt holes of wheel segment 40B. The tapered section of split cylinder 42 being adapted to fit into the tapered section of segment 40B better insures that the bolt holes of the split wheel will be aligned when the halves of the wheel are pulled into juxtaposition. Some split wheels used with this invention may not have tapered or coined holes, in which case the split cylinder will not have a tapered bottom section.

Figure 5:
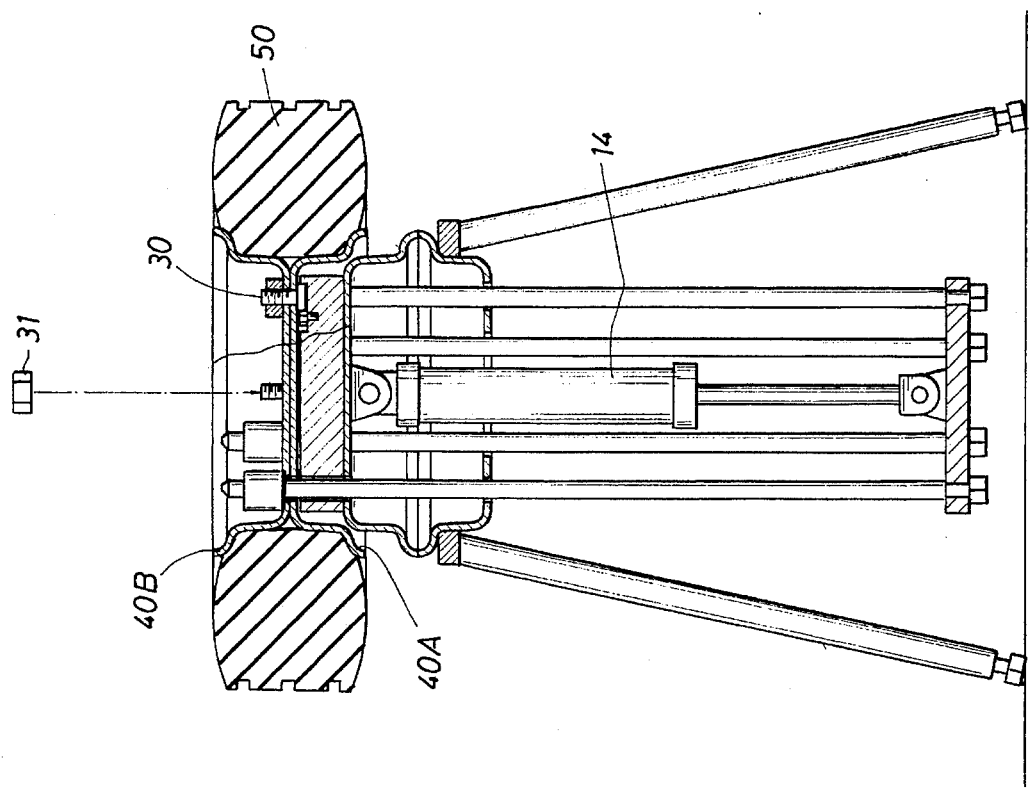
FIG. 5 shows halves of the split wheel in juxtaposition and ready for placing of nuts upon the lug bolts.

Referring to FIG. 5, force of cylinder 14 has been used to bring into juxtaposition halves 40A and 40B of the split wheel. Force from cylinder 14 insures that the head of lug bolts 30 are tightly forced into the recess of guide body cap 18A. Lug bolts 30 are therefore in position for placing nuts 31 on the bolts to secure the halves of the wheel together, while segment 40A is supported by heads of lug bolts 30. After nuts 31 are in position and tightened, the piston of cylinder 14 is moved up to release split cylinders 42 and allow the assembled split wheel to be removed from the tire press.

Figure 6:
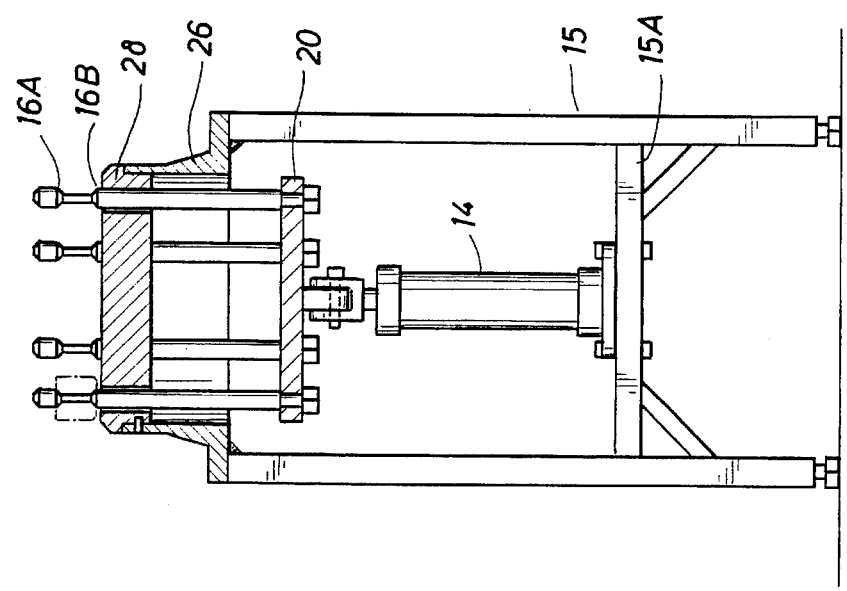
FIG. 6 shows a removable guide member embodiment of this invention.

In FIGS. 1–5, the guide body and guide body cap 18 and 18A are formed so as to provide bolt holes matching the split wheel to be mounted. There are a variety of sizes and configurations of split wheels, however. In another embodiment of the invention, shown in FIG. 6, a removable guide body is supplied for this invention. Removable guide body 28 may have a hole pattern adapted to fit any split wheel which is to be mounted and may be adapted to receive lug bolts 30 and split cylinders 42 as shown in FIGS. 3 and 4. Movable plate 20 will again be adapted to join with cylinder 14 through pinning or other mechanical linkage. The bottom end of cylinder 14 may be attached to cross member 15A of stand 15.

Figure 7:
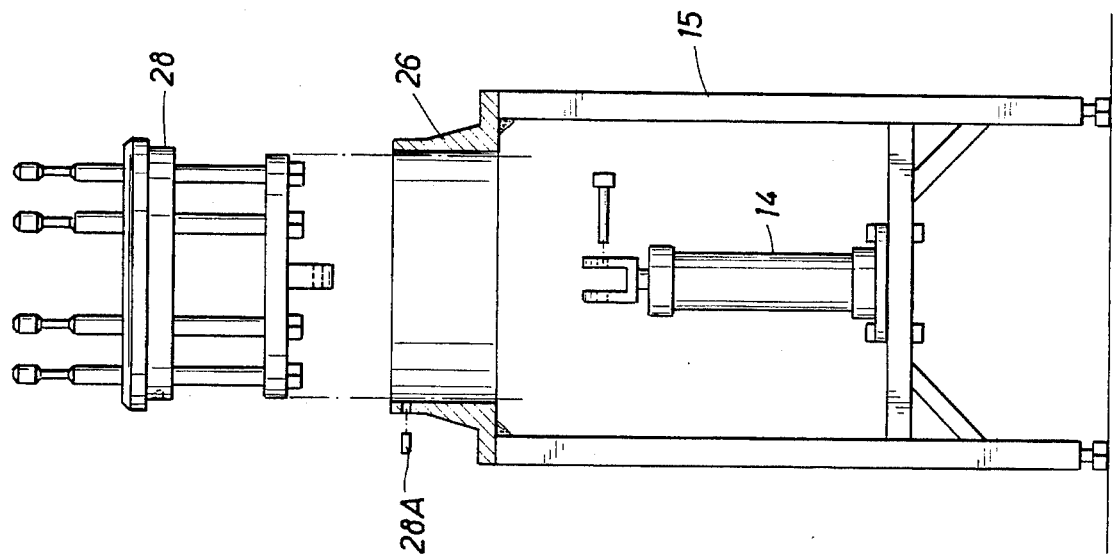
FIG. 7 shows the removable guide body detached from a supporting table and guide body support.

In FIG. 7, removable guide body 28 has been detached from guide body support 26. Pin 28A may be used to fix movable guide body 28 in place. Such movable guide bodies and auxiliary equipment may be quickly interchanged within stand 15, making possible mounting of a large variety of sizes of tires on split wheels and changing from one size to another in a short time.

In most split wheels, there will be two sets of holes, the two sets usually, but not necessarily, having different diameters. The larger holes are usually adapted to fit the lugs on the wheels of the vehicle. The smaller holes are commonly used to join the segments of the wheels and are adapted to receive lug bolts. By the method of this invention, one set of holes, preferably the set used to fix the wheel to a vehicle, is used to receive the tension members and allow the tension members to slidably move through the holes. The diameter of the tension members is selected for guiding the top segment of the wheel as it is pulled into position for fixing with the bottom segment while allowing slidable movement. It is possible to select any set of holes for receiving the tension members or for receiving the means for joining the segments of the wheel. Although lug bolts are described herein, any means for fixing the segments of the wheel in juxtaposition may be used.

Cylinder 14 may have well-known auxiliary hydraulic supply and control equipment. A convenient switch may be used by an operator to move the cylinder upward and downward as required for mounting a tire. Such hydraulic cylinders and controls are well-known in the art.

To mount a tire on a split wheel, lug bolts 30 and anti-rotation screws 32 are put in place within guide body cap 18A, as shown in FIG. 3. One-half of the split wheel is then placed on the press, with due regard for the location of the valve stem opening if a pneumatic tire is being mounted. The head of lug bolt 30, being greater in thickness than the depression in which it is placed, protrudes above guide body cap 18A a sufficient amount that the wheel does not come in contact with guide body cap 18A. This prevents damage to the paint of the split wheel. The tire is then placed over the half split wheel on the press. The cylinder may be activated at this point or previously to raise tension members 16 sufficiently that when segment 40B of the split wheel is in place, the tension members extend sufficiently above that segment to allow split cylinders 42 to be put in place. Cylinder 14 is then activated to bring together segments 40A and 40B, pressing with sufficient force to hold lug bolts in place as nuts 31 are applied. The force of hydraulic cylinder 14 is then released, allowing split cylinders 42 to be removed and tire 50 mounted on the split wheel to be removed from the tire press.

This invention uses the existing holes of the wheel for mounting tires quickly and without scratching any paint on the wheel except at a hole where a mounting nut is to be placed. Many tires were mounted using the apparatus and methods of this invention. The time of mounting the tires was sometimes reduced to ⅕ or less of the time required using conventional methods. The time to mount a 700-12 solid tire was reduced from approximately 15 to 20 minutes using standard techniques to approximately 2 minutes using the apparatus and method of this invention. Since the wheel was supported on the press on the heads of the lug bolts, which extended about 1/64th inch over the surface of the guide body cap, there was no damage to the paint of the wheels during the mounting operation.

In mounting pneumatic tires on split wheels using prior techniques, there are frequently times when the tire is mounted backwards and the valve stem is pointed in the wrong direction. With the method and apparatus of this invention, this cannot happen, because compartment 34 of FIG. 2 can be used to provide a space for the valve stem to extend, and if it is not properly placed, the tire cannot be mounted.

Split cylinder 42 may be conveniently machined from nuts normally used for mounting the split wheel upon a hub. Such nuts may have a taper designed to guide the top segment or half 40B of the split wheel having coined holes into proper position with segment or half 40A.

It will be appreciated that while the present invention has been primarily described with regard to the foregoing embodiments, it should be understood that variations and modifications may be made in the embodiments described herein without departing from the broad inventive concept disclosed above or claimed hereafter.

What is claimed is:

1. Apparatus for mounting a tire on a split wheel, the split wheel having two segments, each segment having a first and a second set of holes therein, comprising:

a support;

a plurality of tension members adapted to pass through the first set of holes of each segment of the split wheel in a first direction and being adapted to receive removable means for stopping movement of the tension members through the first set of holes in a second direction, the second direction being opposite to the first direction;

removable means adapted to stop movement of the tension members through the first set of holes when affixed to the tension members;

means for supplying tension to the tension members; and a guide body, the guide body having an upper surface and a plurality of cavities contiguous with the upper surface adapted to receive lug bolts, the lug bolts having heads and the cavities being in a pattern on the upper surface adapted to match the second set of holes in the two segments of the split wheel, and the guide body further having a pattern of holes adapted to guide the tension members through the first set of holes in the split wheel, so as to draw the two segments of the wheel into into juxtaposition when tension is applied to the tension members with the tire positioned between the two segments of the split wheel being mounted.

2. The apparatus of claim 1 wherein the means for supplying the force is a hydraulic cylinder.

3. The apparatus of claim 1 wherein the guide body is comprised of the two segments of a guide body split wheel each of the segments having a pattern of holes therein and having an outside diameter, the segments being fixed at the outside diameters such that the holes are aligned, the pattern of holes of each segment being the same as the pattern of the first set of holes of the segments of the split wheel being mounted.

4. The apparatus of claim 1 wherein the cavities contiguous with the upper surface of the guide body have a depth less than the thickness of the heads of the lug bolts whereby the segment of the split wheel being mounted is supported on the heads of the lug bolts and at a position spaced apart from the guide body.

5. The apparatus of claim 4 further comprising a means for preventing rotation of the heads of the lug bolts.

6. The apparatus of claim 1 wherein the removable means for stopping movement of the tension members through the holes are split cylinders adapted to be placed over the tension members.

7. The apparatus of claim 6 wherein the split cylinders are tapered to adapt to coined holes of the split wheel being mounted.

8. The apparatus of claim 1 wherein the guide body further comprises a cavity contiguous with the upper surface, the cavity being adapted to receive a valve stem of a pneumatic tire.

9. The apparatus of claim 1 wherein the guide body is removably attached to the support.

10. A method for mounting tires on a split wheel comprising the steps of:

placing lug bolts in cavities of a guide body, the lug bolts being in a pattern adapted to place the lug bolts through a set of holes of the split wheel;

placing a half of the split wheel on the guide body, the guide body having tension members protruding therefrom in a pattern adapted to match the hole pattern of a set of holes of the split wheel;

placing a tire to be mounted on the half of the split wheel;

placing a second half of the split wheel on the tire;

placing on the tension members means for stopping movement of the members through the machine holes;

activating movement of tension members so as to place the halves of the split wheel in juxtaposition; and affixing the halves of the split wheel together.

11. The method of claim 10 wherein the movement of tension members is activated by controlling movement of a hydraulic cylinder.

12. The method of claim 10 further comprising the step of placing a means for preventing rotation of the lug bolts in the cavities of the guide body.

* * * * *